US005821286A

United States Patent [19]
Xu et al.

[11] Patent Number: 5,821,286
[45] Date of Patent: Oct. 13, 1998

[54] BIODEGRADABLE POLYESTER AND NATURAL POLYMER COMPOSITIONS AND FILMS THEREFROM

[75] Inventors: Wayne Xu, Westerville, Ohio; William M. Doane, Morton; John W. Lawton, Jr., Chillicothe, both of Ill.

[73] Assignees: The United States of America as represented by the Secretary of the Agriculture, Washington, D.C.; Biotechnology Research & Development Corporation, Peoria, Ill.

[21] Appl. No.: 653,634

[22] Filed: May 24, 1996

[51] Int. Cl.⁶ .......................... C08L 63/00; C08L 63/02; C08L 67/02; C08L 71/00
[52] U.S. Cl. .................. 524/47; 106/206.1; 106/215.2; 106/215.4
[58] Field of Search .................. 524/47; 106/213, 106/206.1, 215.2, 215.4

[56] References Cited

U.S. PATENT DOCUMENTS

| | | |
|---|---|---|
| 3,149,085 | 9/1964 | Ball et al. . |
| 3,850,862 | 11/1974 | Clendinning et al. . |
| 3,901,838 | 8/1975 | Clendinning et al. . |
| 3,921,333 | 11/1975 | Clendinning et al. . |
| 3,923,729 | 12/1975 | Clendinning et al. . |
| 3,931,068 | 1/1976 | Clendinning et al. . |
| 3,932,319 | 1/1976 | Clendinning et al. . |
| 3,949,145 | 4/1976 | Otey et al. ............................ 428/423 |
| 4,016,117 | 4/1977 | Griffin et al. ............................ 524/47 |
| 4,344,857 | 8/1982 | Shasha et al. .......................... 252/316 |
| 4,483,950 | 11/1984 | Fanta et al. ............................ 524/48 |
| 4,863,655 | 9/1989 | Lacourse et al. ........................ 264/53 |
| 4,873,270 | 10/1989 | Aime et al. ............................ 523/128 |
| 4,911,952 | 3/1990 | Doane et al. ...................... 427/213.31 |
| 4,983,651 | 1/1991 | Griffin ...................................... 524/47 |
| 5,095,054 | 3/1992 | Lay et al. ................................ 542/47 |
| 5,171,820 | 12/1992 | Mang et al. ............................ 528/87 |
| 5,183,690 | 2/1993 | Carr et al. .......................... 427/243.13 |
| 5,185,382 | 2/1993 | Neumann et al. ...................... 521/84.1 |
| 5,186,990 | 2/1993 | Starcevich ............................ 428/35.6 |
| 5,219,646 | 6/1993 | Gallagher et al. ...................... 428/287 |
| 5,234,977 | 8/1993 | Bastioli et al. .......................... 524/47 |
| 5,252,271 | 10/1993 | Jeffs ........................................ 264/54 |
| 5,256,711 | 10/1993 | Tokiwa et al. .......................... 525/411 |
| 5,272,181 | 12/1993 | Boehmer et al. ...................... 521/84.1 |
| 5,292,782 | 3/1994 | Bastioli et al. .......................... 524/47 |
| 5,321,064 | 6/1994 | Vaidya et al. ............................ 524/56 |
| 5,346,936 | 9/1994 | Buehler et al. .......................... 524/47 |
| 5,360,830 | 11/1994 | Bastioli et al. ........................ 521/84.1 |
| 5,384,187 | 1/1995 | Uemura et al. ........................ 428/262 |
| 5,391,423 | 2/1995 | Wnuk et al. ............................ 428/212 |
| 5,412,005 | 5/1995 | Bastioli et al. .......................... 524/47 |
| 5,422,387 | 6/1995 | Toms et al. ............................ 524/52 |
| 5,439,953 | 8/1995 | Ritter et al. ............................ 524/47 |
| 5,446,078 | 8/1995 | Vaidya et al. ............................ 524/17 |
| 5,459,258 | 10/1995 | Merrill et al. .......................... 536/123 |
| 5,462,983 | 10/1995 | Bloembergen et al. .................. 524/51 |
| 5,496,910 | 3/1996 | Mang et al. ............................ 528/88 |
| 5,510,401 | 4/1996 | Dehennau et al. ...................... 524/47 |
| 5,574,076 | 11/1996 | Sharak et al. .......................... 523/128 |
| 5,583,187 | 12/1996 | Sharak et al. .......................... 525/438 |

FOREIGN PATENT DOCUMENTS

| | | |
|---|---|---|
| 0513679 | 5/1992 | European Pat. Off. . |
| 0535994 | 4/1993 | European Pat. Off. . |
| 0667369 | 8/1995 | European Pat. Off. . |
| 2735483 | 6/1995 | France . |
| 4411051 | 3/1994 | Germany . |
| 5-320326 | 12/1993 | Japan . |
| 93/01043 | of 1990 | WIPO . |
| 92/02363 | 2/1992 | WIPO . |
| 93/11937 | of 1993 | WIPO . |
| 93/14911 | of 1993 | WIPO . |
| 93/00399 | 1/1993 | WIPO . |
| 96/03454 | 7/1995 | WIPO . |
| 97/23564 | 7/1997 | WIPO . |

OTHER PUBLICATIONS

Abstract of JP 05320326–A, Dec. 3, 1993, as found in Database WPI, Week 9402, Mar. 16, 1994, AN 94–012391/02.

Fritz et al., "Der Einsatz von Stärke bei der Modifizierung synthetischer Kunststoffe," *Starch/Stärke*, 45, No. 9, (1993) pp. 314–322.

Swanson et al., "Skin and Layer Formation in Films Prepared from Carboydrates, Poly(ethylene–co–acrylic acid), and Polyethylene," *J. of Applied Polymer Science*, 49, No. 10 (Sept. 10, 1993), pp. 1683–1693.

Kotnis et al., "Processing and Mechanical Properties of Biodegradable Poly(hydroxybutyrate–co–valerate)–Starch Compositions," *J. Environ. Polymer Degradation*, 3:2, pp. 97–105 (1995).

Lim et al., "Effect of Starch Granule Size on Physical Properties of Starch–Filled Polyethylene Film," *Biotechnol. Prog.*, 8, pp. 51–57 (1992).

Mang et al., "Synthesis and Properties of Thermoplastic Hydroxy–Functional Polyesters Derived from Diacids and Diglycidyl Ethers," *Polymer Preprints*, 36:2, pp. 180–181 (1995).

Ramsay et al., "Biodegradability and Mechanical Properties of Poly–($\beta$–Hydroxybutyrate–Co–$\beta$–Hydroxyvalerate)–Starch Blends," *Applied and Environmental Microbiology*, 59:4, pp. 1242–1246 (Apr. 1993).

Shogren et al., "Development of Starch Based Plastics—A Reexamination of Selected Polymer Systems in Historical Perspective," *Starch/Stärke*, 45:8, pp. 276–280 (1993).

Tatarka, Paul D., "Can Agricultural Materials Compete with Expanded Polystyrene in the Loose–Fill Market?", *The Plastics Challenge—A Revolution in Education*, Proceedings of the SPE 53rd Annual Technical Conference & Exhibits, pp. 2225–2231 (1995).

(List continued on next page.)

*Primary Examiner*—Nathan M. Nutter
*Attorney, Agent, or Firm*—Majestic, Parsons, Siebert & Hsue

[57] ABSTRACT

Biodegradable films include two biodegradable components. One component preferably is starch while the other component is a water insoluble, synthetic polymer, preferably a hydroxy-functional polyester.

18 Claims, 2 Drawing Sheets

OTHER PUBLICATIONS

Union Carbide's "Material Safety Data Sheet" containing information on Additives, e.g. nomeclature and structure (Oct. 31, 1994).

Shogren, R.L., "Poly(ethylene oxide)–Coated Granular Starch–Poly(hydroxybutyrate–co–hydroxyvalerate) Composite Materials," *J. Environ. Polymer Degradation, 3*:2, pp. 75–80 (1995).

Tiefenbacher, Karl F., "Starch–Based Foamed Materials—Use and Degradation Properties," *J.M.S.—Pure Appl. Chem., A30*(9 & 10), pp. 727–731 (1993).

Westhoff et al., "Starch–Polyvinyl Alcohol Films—Effect of Various Plasticizers," *Starch–Stärke, 31*, pp. 163–165 (1979).

Lawton & Fanta, "Glycerol–Plasticized Films Prepared from Starch—Poly(vinyl alcohol) Mixtures: Effect of Poly(ethylene–co–acrylic Acid)," *Carbohydrate Polymers, 23*, pp. 275–280 (1994).

McCarthy et al., "Recent Advances in Biodegradable Polymers and Blends," Corn Utilization Conference VI, St. Louis, Missouri, Jun. 4–6, 1996.

Shogren et al, "Biodegradable Starch–Polyester Composites," Corn Utilization Conference VI, St. Louis, Missouri, Jun. 4–6, 1996.

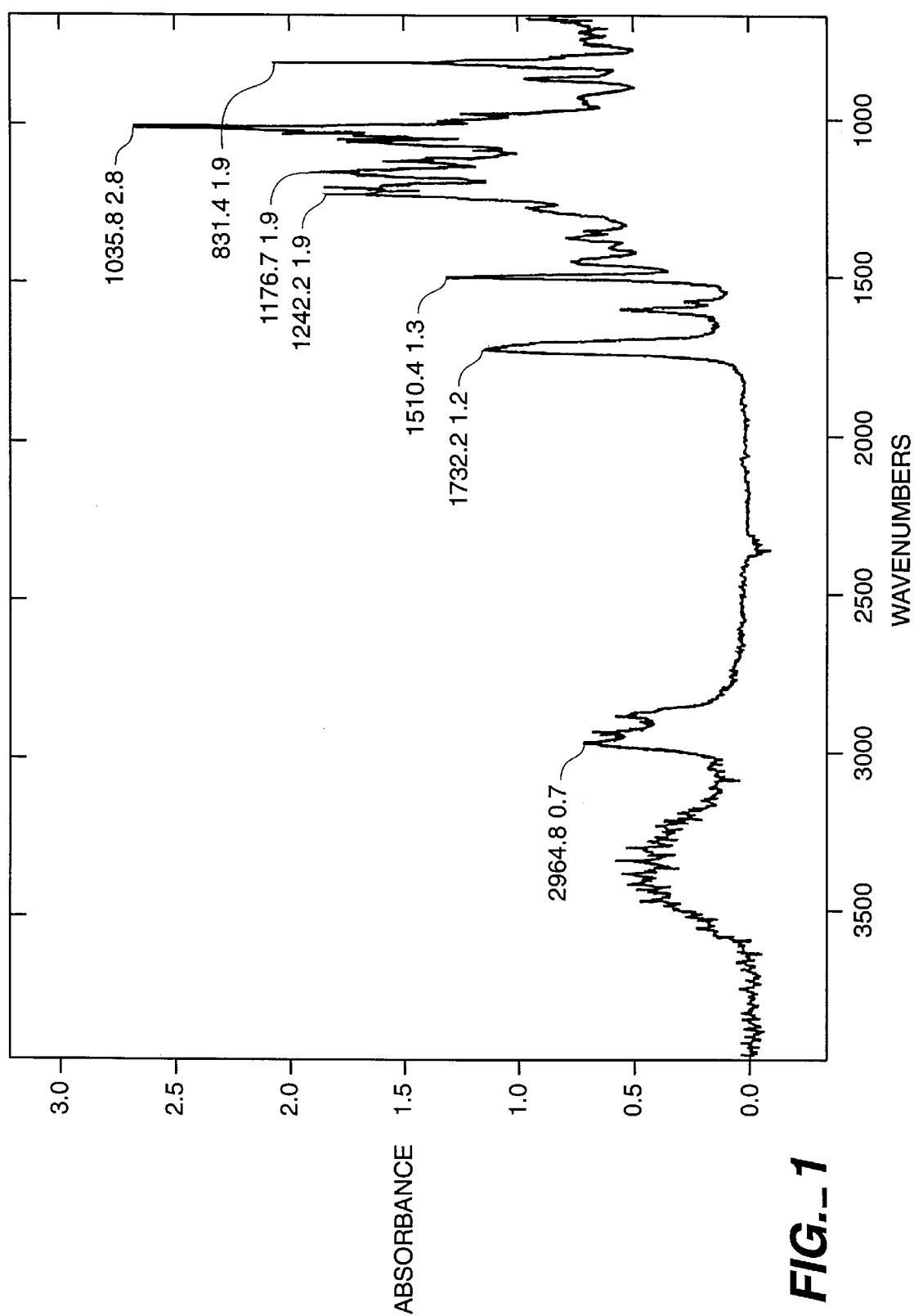
FIG._1

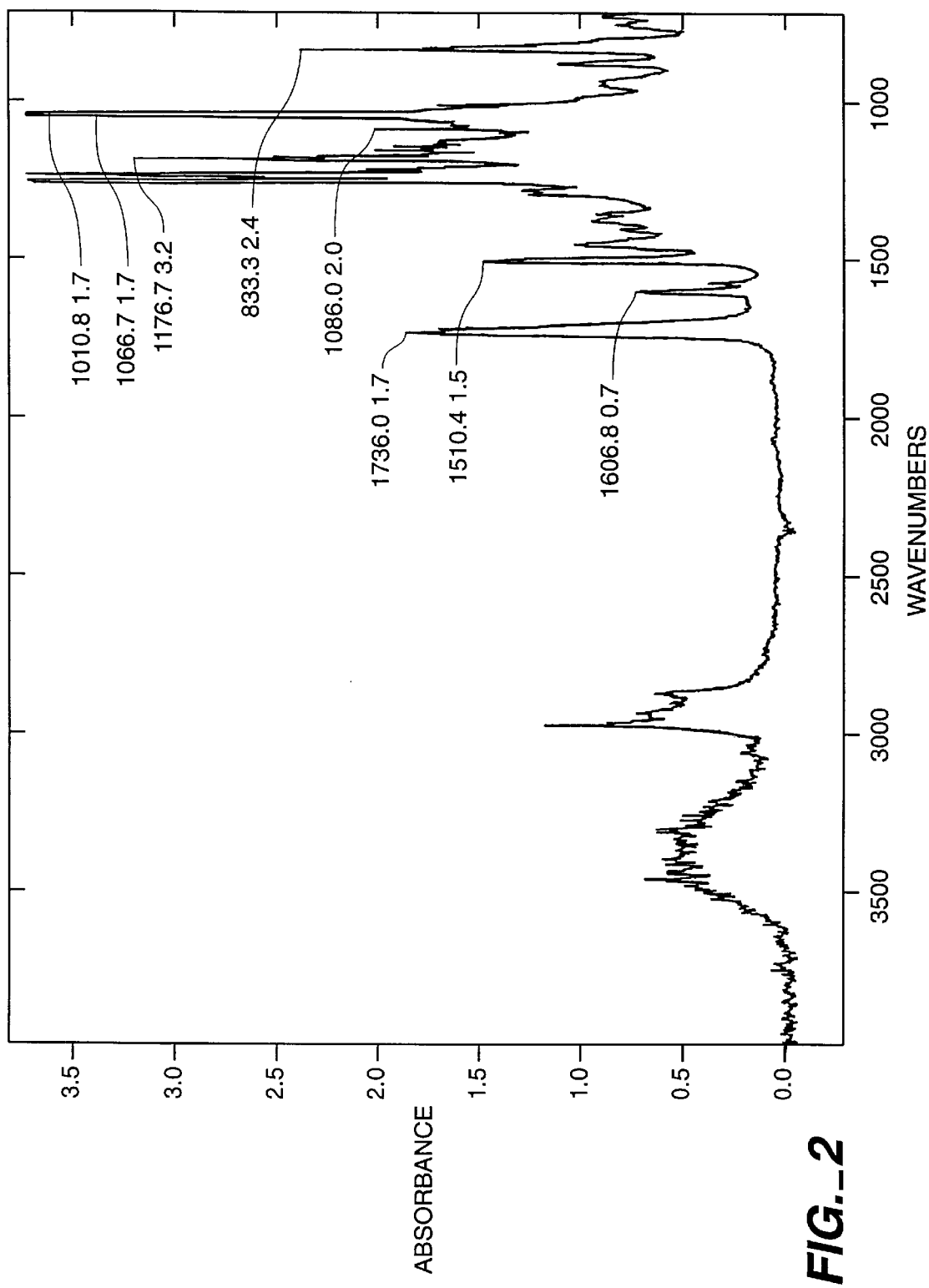
FIG._2

5,821,286

BIODEGRADABLE POLYESTER AND NATURAL POLYMER COMPOSITIONS AND FILMS THEREFROM

This invention was made with government support Grant Agreement No. 59-3K95-3-126 awarded by the United States Department of Agriculture/Agricultural Research Service. The government has certain rights in this invention.

FIELD OF THE INVENTION

The present invention generally relates to films, and more particularly relates to biodegradable admixtures of hydroxy-functional polyester and natural polymers which may be formed as flexible films that are resistant against moisture, and are useful for applications such as packaging and agricultural mulch films.

BACKGROUND OF THE INVENTION

Films which reduce permeability to water and water vapor are useful for a variety of packaging and agricultural applications.

An illustrative agricultural application for films is that of use for agricultural mulches. Thus, U.S. Pat. No. 5,510,401, inventors Dehennau et al., issued Apr. 23, 1996, discusses the coating of a hydrophilic polymer such as starch or gelatin with a film-forming hydrophobic compound. A preferred polymer acting as a coupling agent for such films is a polyolefin modified by grafting maleic anhydride, and of ethylene copolymers and terpolymers containing units derived from maleic anhydride.

Among the different types of packaging films are composites with, for example, one layer often being a flexible polymer, such as a polyethylene or polypropylene, while another layer is coated on or co-extruded and serves as a barrier layer. An example of such a flexible polymer packaging films with deposited inorganic coatings to reduce vapor permeability is provided by U.S. Pat. No. 4,702,963, issued Oct. 27, 1987, inventors Philips et al. The composites described by Patent '963 typically include polyolefin polymers such as polypropylene or polyethylene. However, these materials are not biodegradable. While composites such as those described by Patent '963 may be necessary for packaging medical products, which require sterilization and perhaps long shelf-life, many other packaging applications would preferably use materials that are more moderate in cost and are readily biodegradable.

U.S. Pat. No. 4,863,655, inventors Lacourse et al., issued Sep. 5, 1989, describes the disposal problems associated with most presently used packaging materials formed from synthetic polymers. For example, although expanded polystyrene is a resilient, compressible and low density (about 0.25 lb/ft$^3$) protective packaging filler material and performs its protective function well (e.g. as the ubiquitous "peanuts"), it is not biodegradable.

U.S. Pat. No. 5,412,005, issued May 2, 1995, inventors Bastioli et al. describes biodegradable polymeric compositions based on starch and thermoplastic polymers. However, the preferred polymers are water soluble, such as polyvinyl alcohol. Although these films are biodegradable and absorbent, they are not suitable (at least unless laminated to water insoluble films) for water resistant applications.

U.S. Pat. No. 5,095,054, issued Mar. 10, 1992, inventors Lay et al. describes shaped articles from conventional thermoplastic water-insoluble polymers and melted starch. While these blends may be usefully formed into articles for various applications, they are said to retain a surprisingly high degree of disintegration in contact with liquid water, and thus have limited usefulness with applications where moisture resistance is desired.

Starch itself does not make acceptable films, although blends of starch and polyvinyl alcohol have long been known and can be formed into films with good elongation that are quickly dissolved by water. Such films have found applications, for example, as institutional laundry bags since they dissolve in the washing process. Additions to such films of a plasticizer such as glycerol are also known. See, for example, Westhoff et al., Starch-Stärke, 31, pp. 163–165 (1979) and Lawton & Fanta, *Carbohydrate Polymers*, 23, pp. 275–280 (1994). While useful for various applications where water solubility is needed, such starch and polyvinyl alcohol films are soft, have little or no water resistance, and thus are not applicable for uses where greater structural integrity and water resistance are required.

Attempts have been made to increase water resistance by modifying a starch component into a hydrophobic, ester form. Thus, U.S. Pat. No. 5,462,983, inventors Bloembergen et al., issued Oct. 31, 1995 discloses film forming blends of hydrophobic starch esters and biodegradable polyesters. However, the polyesters apparently require that the starch be derivatized to a hydrophobic, ester form in order to achieve miscibility.

Starch behavior during extrusion and injection molding has been the focus of considerable studies. The state of starch in these various physical changes has been described under names such as melted starch, molecularly dispersed or disrupted starch, destructured starch, and so forth. A historical review of starch transformation when extruded is described by Shogren et al., "Development of Starch-Based Plastics—A Reexamination of Selected Polymer Systems in Historical Perspective," Starch/Stärke, 45, pp. 276–280 (1993).

U.S. Pat. No. 5,272,181, inventors Boehmer et al., issued Dec. 21, 1993, discusses starch-graft copolymers as another packaging material alternative, which materials are also said to readily disintegrate under wet conditions. Although such disintegration may assist in integrating the materials into soil, the disclosed materials are not entirely biodegradable due to the presence of the synthetic resins (such as polyacrylate). Further, as already mentioned, such a wettability property is disadvantageous for applications where moisture will be present.

U.S. Pat. No. 5,185,382, inventors Neumann et al., issued Feb. 9, 1993, describes biodegradable packagings formed from starch and a polyalkylene glycol or derivative. A preferred polyalkylene glycol is polyethylene glycol. However, use of these water soluble components mean that expanded products have little resistance to moisture. Further, the bulk density property from many of the formulations tends to be rather high.

Accordingly, attempts continue to be made to find compositions that are biodegradable, reasonably competitive in price with commodity plastics such as polyethylene or polystyrene, but which are more environmentally friendly, which have adequate moisture resistant properties depending upon the desired application, and which have sufficient structural integrity.

SUMMARY OF THE INVENTION

In one aspect of the present invention, a precursor composition, useful in forming articles such as films, is provided as admixtures of two essential components:

hydroxy-functional polyester and natural polymer, such as starch, preferably in the form of gelatinized starch.

The hydroxy-functional polyesters with which inventive precursor compositions and articles such as films may be formed show a remarkable compatibility with natural polymers, such as starch. Films of the invention are selectively water resistant and have good elongation and structural integrity properties.

Representative chemical structures for suitable hydroxy-functional polyesters in practicing this invention are preferably represented by Formula A (where n provides a sufficient molecular weight, such as for example a m.w. of about 50,000–100,000). Higher molecular weights are preferred due to higher strength.

FIG. 2 is another ATR spectra, but of a film formed entirely of a hydroxy-functional polyester component suitable for use in combination with starch for the invention, shown here for comparison with FIG. 1.

DETAILED DESCRIPTION OF THE PREFERRED EMBODIMENTS

Broadly, precursor compositions of present invention include two essential components: the first component is a synthetic, water-insoluble biodegradable polymer, preferably an hydroxy-functional polyester; and, the second component is a natural polymer, preferably a starch in gelatinized form.

These two essential components may be present in varying amounts, although the natural polymer in the total

FORMULA A

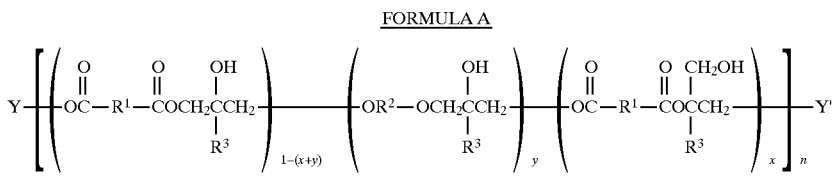

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Suitable polyesters have repeating units represented by Formula B (where each of $R^1$, $R^2$, $R^3$, x, and y are as defined above).

precursor composition and in resulting films will be present as less than about 50 wt. % of the total, preferably be less than about 45 wt. % of total, and most preferably be about 40 wt. % or less of total. The synthetic polymer will be present in amounts from at least about 10 wt. % to about 70 wt. %. Each of the components suitable for preparing compositions of the invention will now be more fully described.

FORMULA B

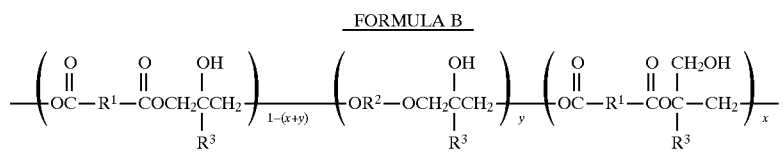

The preferred starch component is derived from a gelatinized starch. The starch component will be present in amounts of less than about 50 wt. %. The hydroxy functional polyester will be present in amounts from at least about 10 wt. % up to about 70 wt. %.

In applications where some water absorption is acceptable, so long as the films maintain structural integrity for a reasonable period of time, then amounts of the hydroxy polyester resin can be reduced from the upper end towards the lower end by inclusion of a synthetic vinyl polymer such as poly(vinyl alcohol). Inclusion of such a synthetic vinyl polymer improves film properties for some applications, although it reduces water resistance. Thus, the water resistance properties can be selected, by reducing or increasing such a component, since for a number of applications, such as agricultural mulch uses, films of the invention including poly(vinyl alcohol) have sufficient structural integrity and water resistance for weed control while young crop plants can best receive benefit, but can suitably disintegrate, or dissolve, thereafter. A further optional component, preferred for blown films, is a plasticizer.

BRIEF DESCRIPTION OF THE DRAWINGS

FIG. 1 is an ATR spectra of an inventive film; and

SUITABLE HYDROXY-FUNCTIONAL POLYESTERS

Suitable biodegradable, water insoluble, synthetic polymers for use in inventive compositions and resulting films include hydroxy-functional polyesters, which may be prepared from base-catalyzed nucleophilic addition of suitable acids to epoxies. This reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C. The preparation and structures for such hydroxy-functional polyesters suitable in practicing this invention may be as described by U.S. Pat. No. 5,171,820, inventors Mang and White, issued Dec. 15, 1992, which is hereby incorporated in its entirety by reference.

Data provided by the Dow Chemical Company (manufacturer of hydroxy-functional polyesters such as described by U.S. Pat. No. 5,171,820) indicates the biodegradable nature of these polymers through the ability of various soil bacteria (such as *Pseudomonas putida*) to use the synthetic polymers as a substrate for cell culture growth.

Representative structures for suitable hydroxy-functional polyesters in practicing this invention are preferably represented by Formula A (where n provides a sufficient molecular weight, such as for example a m.w. of about 50,000–100,000). Higher molecular weights are preferred due to higher strength.

Particularly preferred such polyesters are prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

FORMULA A

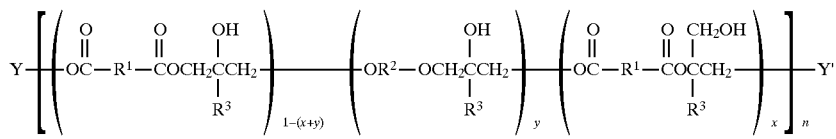

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2$, $R^3$, x, and y are as defined above).

Four particularly preferred hydroxy-functional polyesters, used extensively to illustrate (but not to limit) the present invention, are sometimes hereinafter designated "BIS CHD," "BIS Adipic," "HQ DDCA" and "BIS DDCA." Repeating unit structures for these four illustrative hydroxy-functional polyesters are illustrated by Formulas C–F and several of their properties of interest for the invention are summarized in Table A.

FORMULA B

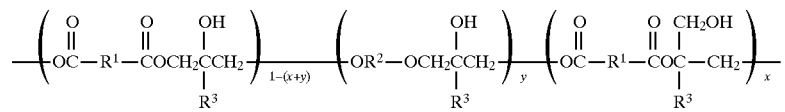

FORMULA C

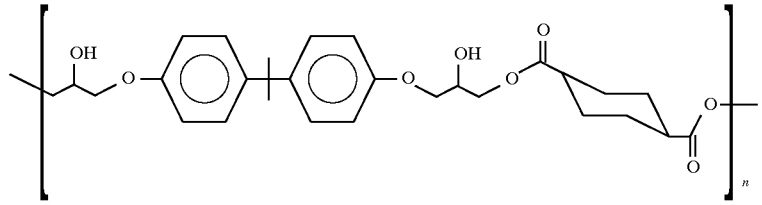

FORMULA D

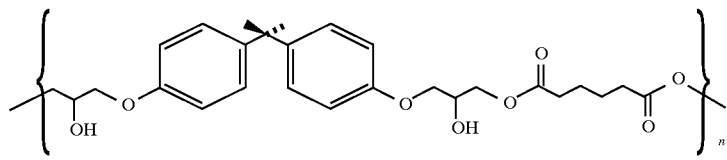

-continued
FORMULA E

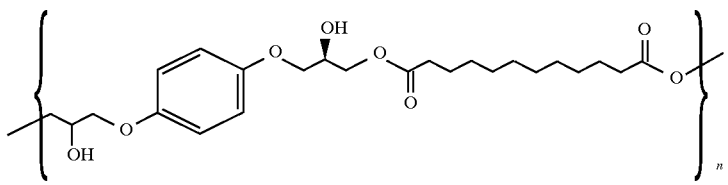

FORMULA F

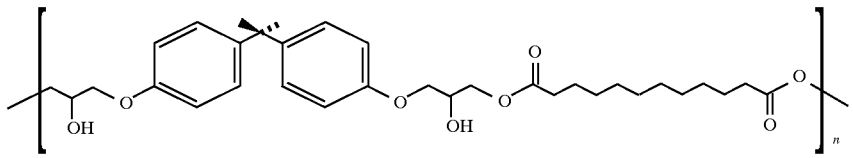

In the Formulas C–F, "n" preferably is as earlier described.

TABLE A

| Hydroxy-Functional Polyester Components | Tg(°C.) |
| --- | --- |
| BIS CHD | 66 |
| BIS Adipic | 45 |
| HQ DDCA | 10 |
| BIS DDCA | 20 |

NATURAL POLYMERS

Among the natural polymers suitable and preferred for practicing this invention is starch. Starches are preferred for use as the natural polymers, particularly due to ready availability and low cost. Thus, starch is a low-cost and abundant natural polymer composed of amylose and amylopectin. Amylose is essentially a linear polymer having a molecular weight in the range of 100,000–500,000, whereas amylopectin is a highly branched polymer having a molecular weight of up to several million. Unmodified, natural starches are obtained in granular form and may be derived from cereals or grains (such as corn, wheat, rice and sorghum), roots (such as cassava), legumes (such as peas), and tubers such as potato and canna. While less preferred, flours whose contents are predominately starch, and which may also contain protein, oil and fiber, are operative in the invention.

When starch is said to be "gelatinized" it has melted and lost its crystalline state. The starch molecules have taken on a random, disordered configuration and the starch chains have become entangled. Thus, when the gelatinized starch is admixed with the synthetic polymer under extrusion conditions so that the entire admixture is molten, the two molten polymers (natural polymer and synthetic polymer) would be expected to be homogeneously dispersed throughout the body of the extrudate in the respective proportions of each component; however, this does not occur for practice of the invention. Instead, the synthetic polymer has been found to partition so as to predominate along exterior surfaces of the films and to remain as the predominate component along exterior surfaces.

FIG. 1 is an Attenuated Total Reflectance IR Spectroscopy spectrum of a film of the present invention (described in Example 1 hereinafter). This technique ATR, analyzes the surface of a specimen. FIG. 2 is by a similar technique, but is of a film formed entirely of the same hydroxy polyester used as one component for the FIG. 1 spectra. As can be seen, the spectra are identical (except for intensity) and demonstrate that the surface of the inventive film consists entirely of the particular polymer.

FILM PREPARATION AND OTHER COMPONENTS

Precursor compositions of the invention will typically be processed in a suitable apparatus, such as a single screw extruder or a twin screw extruder as are well known in the food science field. Food extruders can be regarded as high temperature, short time reactors, in which granule starch having a moisture content of roughly 10–25% is first compressed into a dense, compact solid and then is converted into a molten, amorous mass by the high pressure, heat, and mechanical sheer forces encountered during processing. Starch extrudates tend to expand upon exiting the extruder die. As earlier noted, Shogren et al., supra, describe starch extrusion and cite a number of reviews related to food processing. Twin screw extruders tend to be more expensive, but permit the addition of water during the processing. This means that the precursor composition fed into a twin screw extruder need not have the starch in a pre-gelatinized form, since starch gelatinization can occur during the extrusion process itself as water is added.

When one uses a single screw extruder, then normally the precursor composition will have the starch already gelatinized. A precursor composition in which the starch component is to be gelatinized will typically have water present in a range of about 25 wt. % to 30 wt. % with respect to total composition. Water, of course, is the usual liquid in which starch is gelatinized and its role in the gelatinization can be viewed as one of plasticizer. While water is preferred, other gelatinizing agents, or plasticizers, can be used, for example, such as urea or glycerol.

Precursor compositions can be melt processed into films using either cast or blown film extrusion methods, both of which are described in "Plastics Extrusion Technology—2nd. Ed." by Allan A. Griff (Van Nostrand Reinhold, 1976). Cast film is extruded through a linear slot die. Typically, the flat web is cooled on a large moving polished metal roll. It quickly cools, and peels of this first roll passes over one or more auxiliary cooling rolls, then through a set of rubber-coated pull or "haul-off" rolls, and finally to a winder.

In blown film extrusion, the melt is extruded upward through a thin annular die opening. This process is also referred to as tubular film extrusion. Air is introduced through the center of the die to inflate the tube and causes it to expand. A moving bubble is thus formed which is held at constant size by control of internal air pressure. The tube of film is cooled by air blown through one or more chill rings surrounding the tube. The tube is next collapsed by drawing it into a flattening frame through a pair of pull rolls and into a winder.

Precursor compositions of this invention can have part of the hydroxy-functional polyester replaced by a synthetic vinyl polymer such as poly(vinyl alcohol) or "PVA." Thus, amounts of PVA may range from 0–40 wt. % in the total inventive compositions and resulting films which, when combined with the hydroxy-functional polyester, will constitute the major component of the compositions. Inclusion of PVA will enhance film softness and film elongation, but does reduce water resistance. Therefore, the choice of whether to add PVA and the selection of the amount to be added will depend upon the balance of properties desired for the resulting films.

In addition, a suitable optional material is a plasticizer (in addition to the gelatinizing agent as already discussed). A plasticizer can be added to inventive compositions to achieve greater material processability and product flexibility, although plasticizers typically soften the compositions in which they are included. This is not always true, however, of compositions of the invention. When incorporated into compositions of the invention, the plasticizers preferably are biodegradable. Examples of biodegradable plasticizers include various esters, such as phthalate esters, and various other biodegradable esters known in the chemical arts. Plasticizers (other than water) are particularly preferred for inclusion into blown films, but more typically are not needed for cast films.

Other optional components known in the art, including, but not limited to, antiblocking agents, antistatic agents, slip agents, pro-heat stabilizers, antioxidants, pro-oxidant, additives may be incorporated.

Antiblocking agents act to prevent film layers from sticking to one another when wound into a roll or when packaged in contact with one another. Typical antiblocking substances include concentrates of silica or talc blended with a polymeric materials such as polyethylene or polycaprolactone.

Reduction of blocking can also be obtained by loading the film surface with small particles or powders such as chalk, clay, silica, starch, and similar materials. Powdered polymeric materials (e.g. polytetrafluoroethylene) can also be used to reduce blocking when applied to the surface of films of the present invention. Such film surface treatments can be used to reduce blocking alone or in combination with other antiblock methods. The quantity of powder antiblock substance commonly added to the surface of a film, when used, is from about 0.5 $g/m^2$ to about 5 $g/m^2$.

Antistatic agents may be incorporated in films of the present invention; examples of such agents include ethoxylated amines and quaternary amine salts having organic constituents of about 12–18 carbon atoms in length. Agents of this type slowly defuse to the surface of the film and, because of their ionic character, form an electrically conductive layer on the surface of the film. Antistatic agents commonly constitute from about 1% to about 5% of the weight of the films, when used.

Slip agents may be incorporated into the films of the present invention to reduce drag over rollers and other forming equipment. Examples of such agents are those commonly derived from amides of fatty acids having about 12–22 carbon atoms. Such agents may augment the antiblocking properties of the films of the present invention. Such slip agents are commonly incorporated in films from about 0.05% to about 3% of the weight of the films when used.

EXPERIMENTAL

Aspects of the invention will now be illustrated, without intending any limitation, by the following examples.

Example 1

A composition consisting of BIS Adipic polyester (70%) and starch (30%) containing 25% moisture based on starch was processed on a Brabender PL 2000 torque rheometer using a mixing screw (¾ inch, L/D=30). Extruded strands were pelletized and the moisture adjusted to a total of 6.5% for the pellets. The pellets were re-fed to the same torque rheometer that was now fitted with a 1 inch blown film die. The composition was processed into a blown film with a lay flat width of about 3 inches. The film was somewhat transparent and highly water resistant.

Scanning electron microscopy of an edge of the film revealed a center portion containing starch and outer surface consisting of BIS Adipic polyester. Confirmation of this film structure was confirmed by Attenuated Total Reflectance Infra Red Spectroscopy, as already described by FIG. 1. Absorbance spectra of the film surface revealed absorbance only for the BIS Adipic polyester.

The percent elongation of the film averaged 105.50% and the tensile strength averaged 16.03 MPa. The films tested had an average thickness of 0.1126 mm. Water resistance was measured by water uptake by placing film specimens in water for a short time, removing the specimens, removing excess surface water by blotting, and weighing the resulting specimen. The increase in weight of the soaked films was expressed in percent of the initial weight. Since the film specimens had edges that would allow the internal portion of the film to be exposed to water, it would be expected that some water pickup would occur at the edges. As the original films were produced as bubbles, cutting films into strips does expose the center of the film at the cut edges. The water uptake as a percent for the Example 1 films was, however, only 1.6%.

Example 2

A composition consisting of 42½ parts each of cornstarch and PVA and 15 parts of glycerol and enough water to equal about 30% of the total weight of the other three components was prepared. To prepare the composition about ¾s of the total amount of water was first added to the PVA and mixed in by hand. In a separate container the total amount of glycerol and the remaining ¼ of the water were added to the starch and mixed in by hand. The two separate mixtures were then added together and mixed well. To this combined mixture was blended in an amount of BIS Adipic polyester such that the total composition contained 20% by weight of the solids as the polyester. This mixture was then processed in a Brabender PL2000 torque rheometer fitted with a 1 inch blown film die into a blown film with a lay flat width of about 3 inches. The film was clear and was water resistant.

Example 3

A composition consisting of 63% normal cornstarch (10% moisture), 25% glycerol, 7% urea, and 5% poly(ethylene-co-acrylic acid) was processed on a laboratory twin-screw extruder fitted with compounding screws. The extruded strands were pelletized. The pellets were mixed with BIS Adipic polyester in the ratio of 70% pellets to 30% BIS Adipic. The mixture was processed on the same twin-screw extruder fitted with the same screws. The extruded strands were pelletized. The pellets were processed on a Brabender PL200 torque rheometer that was fitted with a high shear screw and a ½ inch blown film die. The film was somewhat transparent and highly water resistant.

Example 4

A composition consisting of 68% normal cornstarch (10% moisture), 25% glycerol, and 7% urea was processed on a laboratory twin-screw extruder fitted with compounding screws. The extruded strands were pelletized. The pellets were mixed with BIS Adipic polyester in the ratio of 70% pellets to 30% BIS Adipic. The mixture was processed on the same twin-screw extruder fitted with the same screws. The extruded strands were pelletized. The pellets were processed on a Brabender PL200 torque rheometer that was fitted with a high shear screw and a ½ inch blown film die. The film was somewhat transparent and highly water resistant.

Example 5

A number of compositions were prepared as outlined in the table below. Except for composition 50, which was high amylose starch, the starch component used was normal cornstarch. The compositions also could include PVA (Airvol 325, intermediate molecular weight, fully hydrolyzed), EAA-poly(ethylene-co-acrylic acid), glycerol, and BIS Adipic polyester. The compositions were prepared with enough water to equal about 30% of the total weight of the ingredients before compounding, except for composition 49 which had 20% water. To prepare the compositions for compounding, ¾s of the added water was added to PVA and mixed by hand. In a separate container, the total amount of glycerol and the remaining portion of the water was added to the starch and mixed by hand. The two separate mixtures were then combined and mixed with a kitchen mixer. The final mixture was extruded through a laboratory twin-screw extruder fitted with compounding screws. The compounded material was chopped and then processed in a Brabender PL2000 torque rheometer fitted with high shear screw and a ½ inch blown film die. Films were clear and water resistant.

Compositions 52–58 had the BIS Adipic polyester added to the chopped, compounded starch-PVA immediately before the blowing step. The mixtures were then processed in a Brabender PL2000 torque rheometer fitted with a high shear screw and a ½ inch blown film die. Compositions 46–50 were initially compounded.

Films were clear and tended to be water resistant when compared to a control film prepared as for compositions 52 or 53, but without any "BIS Adipic" polyester.

TABLE 1

| Composition | Starch | PVA | EAA | Glycerol | BisA | Tensile Strength | % E |
|---|---|---|---|---|---|---|---|
| 46 | 38.25 | 38.25 | 0 | 13.5 | 10 | 19.0 | 149.9 |
| 47 | 34 | 34 | 0 | 12 | 20 | 19.7 | 187.2 |
| 48 | 34 | 34 | 0 | 12 | 20 | 22.1 | 204.4 |
| 49 | 50 | 15 | 0 | 15 | 20 | 9.7 | 72.2 |
| 50 | 34 | 34 | 0 | 12 | 20 | 14.17 | 51.2 |
| 51 | 32.8 | 32.8 | 2.4 | 12 | 20 | 12.7 | 289.8 |
| 52 | 36.9 | 36.9 | 2.7 | 13.5 | 10 | 22.0 | 131.4 |
| 53 | 32.8 | 32.8 | 2.4 | 12 | 20 | 23.5 | 196.8 |
| 54 | 45.9 | 27.9 | 2.7 | 13.5 | 10 | 19.6 | 101.2 |
| 55 | 40.8 | 24.8 | 2.4 | 12 | 20 | 19.6 | 135.1 |
| 56 | 36.9 | 36.9 | 2.7 | 13.5 | 10 | 25.6 | 135.2 |
| 57 | 36.9 | 36.9 | 2.7 | 13.5 | 10 | 16.2 | 115.6 |
| 58 | 48.8 | 16.8 | 2.4 | 12 | 20 | 6.2 | 22.6 |

The water uptake experiment described in Example 1 was repeated, but for compositions 52 and 53, which was then compared to a control having the same components as the 52 and 53 film compositions but without the BIS Adipic polymer. The water uptake compared to control of the films resulting from compositions 52 and 53, respectively, was improved with respect to the control by 18% and 34%. Thus, although these polyvinyl alcohol containing films are more water sensitive (than a film containing no PVA, such as illustrated by Example 1), they are nevertheless considerably less water sensitive than starch/PVA films as known to the art that do not contain the polyester component. Accordingly, where improved structural integrity, but only modest water resistance, is needed for film applications, such as in uses for agricultural mulches, then the PVA containing films of the invention are suitable, whereas for substantially complete water resistance then films such as illustrated by Example 1 are preferred.

It is to be understood that while the invention has been described above in conjunction with preferred specific embodiments, the description and examples are intended to illustrate and not limit the scope of the invention, which is defined by the scope of the appended claims.

It is claimed:

1. A composition, useful in forming moisture resistant biodegradable articles, comprising:

an admixture, the admixture having as the minor component a gelatinized starch and having at least about 10 wt. % to about 70 wt. % of a hydroxy-functional polyester therein, wherein the hydroxy-functional polyester has repeating units represented by Formula B:

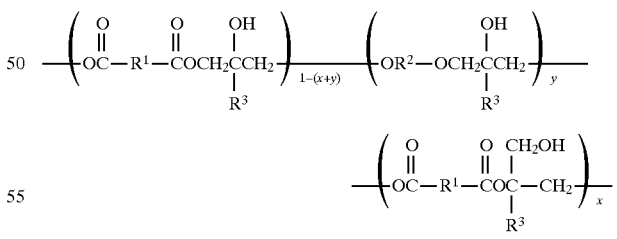

where each of $R^1$ and $R^2$ is individually a divalent organic moiety which is predominately hydrocarbon, each $R^3$ is individually hydrogen or lower alkyl, y is a fraction from 0 to 0.5, and x is a fraction from about 0.05 to about 0.4.

2. The composition as in claim 1 wherein the admixture is molten.

3. The composition as in claim 1 wherein the admixture optionally includes from about 0 wt. % to about 40 wt. % poly(vinyl alcohol).

4. The composition as in claim 1 further comprising a plasticizer.

5. The composition as in claim 1 wherein the polyester includes a repeating structure shown by Formula C:

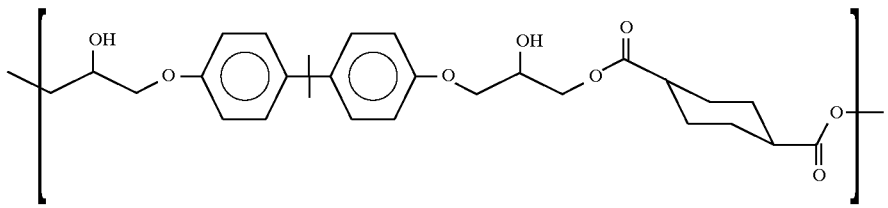

6. The composition as in claim 1 wherein the polyester includes a repeating structure shown by Formula D:

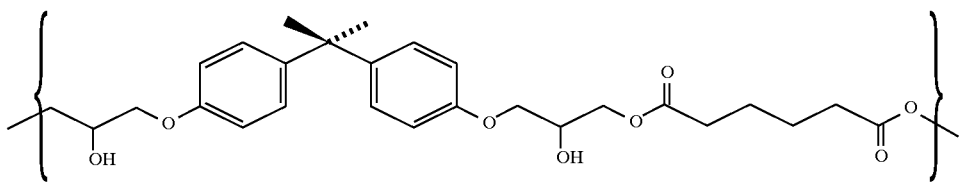

7. The composition as in claim 1 wherein the polyester includes a repeating structure shown by Formula E:

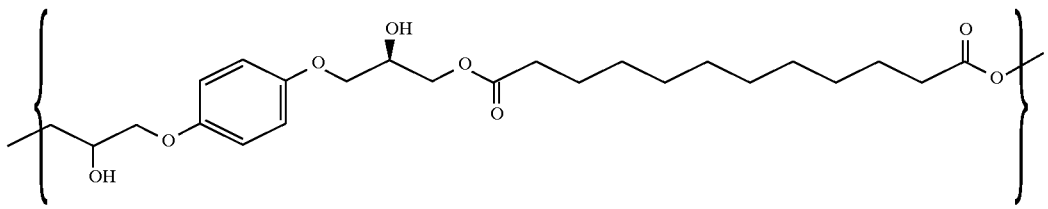

8. The composition as in claim 1 wherein the polyester includes a repeating structure shown by Formula F:

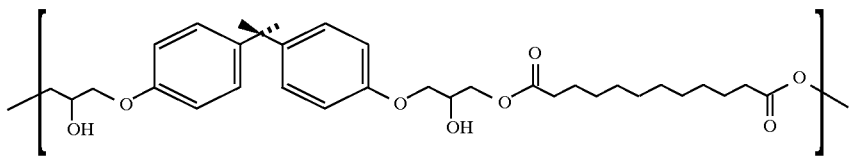

9. A biodegradable film comprising:

a gelatinized starch as a minor component of the total; and a synthetic polymer, the synthetic polymer being a hydroxy-functional polyester in an amount of the total film of from about 10 wt. % to about 70 wt. %, the film defining a surface, the surface being substantially entirely formed by synthetic polymers wherein the synthetic polymer includes repeating units represented by Formula B:

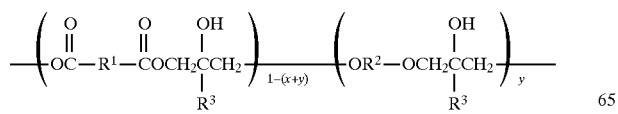

-continued

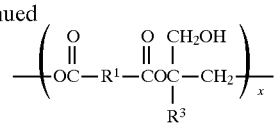

where each of $R^1$ and $R^2$ is individually a divalent organic moiety, each $R^3$ is individually hydrogen or methyl, y is a fraction from 0 to 0.5, and x is a fraction from 0.05 to about 0.4, and wherein each of $R^1$ and $R^2$ is:

(a) arylene, alkylenearylene, dialkylenearylene, diaryleneketone, diarylenesulfone, diarylenesulfoxide, alkylenecarbonylarylene, alkylenesulfonylarylene, alkylidenediarylene, diarylene oxide, alkyleneoxyarylene, alkylenethioarylene, diarylene sulfide, or diarylenecyanomethane; or (b) alkylene, dialkyleneketone, dialkylenesulfone, dialkylenesulfoxide, dialkyleneoxide, or dialkylenesulfide.

10. The film as in claim 9 further comprising a vinyl alcohol copolymer.

11. The film as in claim 9 wherein the surface is substantially liquid resistant.

12. The film as in claim 10 wherein the vinyl alcohol is poly(vinyl alcohol).

13. The film as in claim 12 wherein the poly(vinyl alcohol) is in an amount of up to about 40 wt. % of the total film.

14. The film as in claim 9 further including a plasticizer.

15. The film as in claim 9 wherein each of $R^1$ and $R^2$ is individually a divalent aromatic moiety selected from the group consisting of m-phenylene, p-phenylene, isopropylidene, diphenylene, biphenylene, biphenylene oxide, methylenediphenylene, biphenylene sulfide, naphthylene, biphenylenecyanomethane, 3,3'-dialkyldiphenylene-isopropylidene, 3,3',4,4'-tetralkyldiphenylene-isopropylidene, and similar alkyl-substituted derivatives of such aromatic moieties.

16. The film as in claim 9 wherein each of $R^1$ and $R^2$ is individually a divalent aliphatic moiety selected from the group consisting of ethylene, propylene, and butylene.

17. The composition as claim 1 wherein each $R^3$ is individually hydrogen or methyl.

18. The composition as in claim 17 wherein each of $R^1$ and $R^2$ is a divalent aromatic moiety, an aliphatic hydrocarbon divalent moiety, or an aliphatic heteroatomic moiety wherein the heteroatomic moiety is oxygen, sulfur, imino, sulfonyl, carboxyl, carbonyl, or sulfoxyl.

* * * * *